United States Patent [19]
Brownrigg et al.

[11] Patent Number: 5,099,131
[45] Date of Patent: Mar. 24, 1992

[54] ACQUISITION AND TESTING OF LATENT FINGERPRINTS USING UPCONVERSION

[75] Inventors: Patrick C. Brownrigg, Long Beach; Slava A. Pollack, Palos Verdes Estates; Victor Vali, Laguna Hills, all of Calif.

[73] Assignee: Hughes Aircraft Company, Los Angeles, Calif.

[21] Appl. No.: 623,858

[22] Filed: Dec. 7, 1990

[51] Int. Cl.$^5$ .............................................. G01J 1/58
[52] U.S. Cl. ................... 250/458.1; 250/459.1
[58] Field of Search ............... 250/458.1, 459.1, 461.1; 356/71

[56] References Cited

U.S. PATENT DOCUMENTS

| | | | |
|---|---|---|---|
| 4,794,260 | 12/1988 | Asano et al. | 250/458.1 |
| 4,956,558 | 9/1990 | Batishko et al. | 250/461.1 |
| 4,983,846 | 1/1991 | Rios et al. | 250/459.1 |

*Primary Examiner*—Carolyn E. Fields
*Attorney, Agent, or Firm*—Michael W. Sales; Wanda K. Denson-Low

[57] ABSTRACT

Latent fingerprints are detected by upconverting infrared radiation provided by a special dusting powder and digitally imaging the upconverted radiation. In accordance with the principles of the present invention, a real time image of latent fingerprints is obtained by first "dusting" the print with a powdered upconversion material. The print is then illuminated with 1.55 μm infrared radiation using a fiber optic bundle in the form of a probe. The 1.55 μm infrared radiation is converted into several reradiated wavelength bands by the powdered upconversion material. A charge coupled device or diode matrix detector array converts the image of the fingerprint to digital format for real time display and/or transmission over airwaves. The system is a portable latent fingerprint acquisition system that permits rapid fingerprint evaluation and comparison. A method of detecting fingerprints is also disclosed.

15 Claims, 1 Drawing Sheet

IMAGE OF 11

ACQUISITION AND TESTING OF LATENT FINGERPRINTS USING UPCONVERSION

BACKGROUND

The present invention relates generally to fingerprint identification, and more particularly, to fingerprint identification systems utilizing the upconversion and detection of infrared radiation.

Fingerprint acquisition and test by law enforcement personnel in the field can be a slow process when timeliness in suspect apprehension is imperative. The current method of acquiring and identifying latent fingerprints is to "dust" an area where they are believed to have been recorded. An officer then carefully uses tape to lift the print for transport to a laboratory. In the laboratory the prints are compared with known prints on file or are sent to a central lab for further processing and identification. State-of-the-art systems employ a 2 million dollar laser scan technique for maximizing signal to noise and digital conversion for automated comparison. Few law enforcement agencies can afford this system. Also, because of the time required to identify prints, a suspect may not be apprehended because of the unavailability of the prints by an arresting officer.

Accordingly, it would be an advance in the art to have a system that provides for latent fingerprint acquisition and rapid evaluation and comparison of fingerprints that may be employed in the field.

SUMMARY OF THE INVENTION

Latent fingerprints are detected by upconverting radiation provided by a special dusting powder and digitally imaging the upconverted radiation. In accordance with the principles of the present invention, a real time image of latent fingerprints is obtained by first "dusting" the fingerprint with a powdered upconversion material. Triply ionized rare earth erbium may be employed as powdered upconversion material. The fingerprint is then illuminated with 1.55 μm infrared radiation using an erbium laser light source, for example, using a fiber optic bundle in the form of a probe. The 1.55 μm infrared radiation is converted into several reradiated wavelength bands by the powdered upconversion material. A charge coupled device or diode matrix detector array and appropriate electronics are employed to convert the image of the fingerprint to digital format for real time display and/or transmission over airwaves.

More particularly, the system for detecting a fingerprint comprises a material capable of converting radiation at a first predetermined wavelength into radiation at a second wavelength when irradiated with radiation at the first predetermined wavelength. This material is deposited onto a fingerprint under investigation. A light source provides radiation at the first predetermined wavelength. A detector is provided for imaging radiation at the second wavelength to provide an image. A light coupling arrangement is disposed between the light source and the fingerprint for coupling radiation at the first predetermined wavelength to the fingerprint, and disposed between the detector and the fingerprint for coupling radiation at the second wavelength from the fingerprint to the detector. The radiation provided by the light source that radiates the fingerprint is converted into radiation detectable by the detector by the material deposited on the fingerprint. The detector then produces an image of the fingerprint.

The system of the present invention provides a user with a portable latent fingerprint acquisition system that permits rapid fingerprint evaluation and comparison. The present invention has numerous advantages. These include the fact that there is no background, thus providing a large signal to noise ratio; the system is eyesafe; the system may be operated in daylight; and the system expedites the latent fingerprint identification process. This system may be of benefit to various law enforcement agencies, and in addition, where credit card companies may wish to verify card ownership by fingerprint comparison, a rapid and economical system is now available.

A method of detecting a fingerprint in accordance with the present invention comprises the following steps. Depositing a material onto a fingerprint that is capable of converting radiation at a first predetermined wavelength into radiation at a second wavelength when irradiated with radiation at the first predetermined wavelength. Illuminating the fingerprint with radiation at the first predetermined wavelength. Detecting radiation at the second wavelength emitted by the fingerprint. Converting the detected radiation into an image of the fingerprint.

BRIEF DESCRIPTION OF THE DRAWINGS

The various features and advantages of the present invention may be more readily understood with reference to the following detailed description taken in conjunction with the accompanying drawings, wherein like reference numerals designate like structure elements, and in which.

DETAILED DESCRIPTION

It is well known that triply ionized rare earth Erbium ($Er^{3+}$) atoms contained as an impurity in various host lattices, including calcium fluoride ($CaF_2$) for example, upconvert 0.9 μm and 1.55 μm radiation to longer wavelengths through a cooperative excitation process. By illuminating 1.55 μm infrared radiation on an upconversion material, such as triply ionized rare earth erbium, for example, the upconversion material radiates at several visible and near infrared radiation wavelength with a conversion efficiency of approximately 10%. The upconversion material comprises erbium crystals that are pulverized to have a particle size of less than 25 μm without destroying their cooperative luminescene capability. The erbium upconversion material is insoluble in water and is suitable for use in high humidity environments. For ease of reference the phrases "erbium crystal", "Erbium powder", "upconversion crystal" or "upconversion material" or "upconversion powder" may each be used to refer to the corresponding state of a suitable host material which contains the triply ionized erbium atom as a dopant or impurity in its lattice structure.

Figure 1:
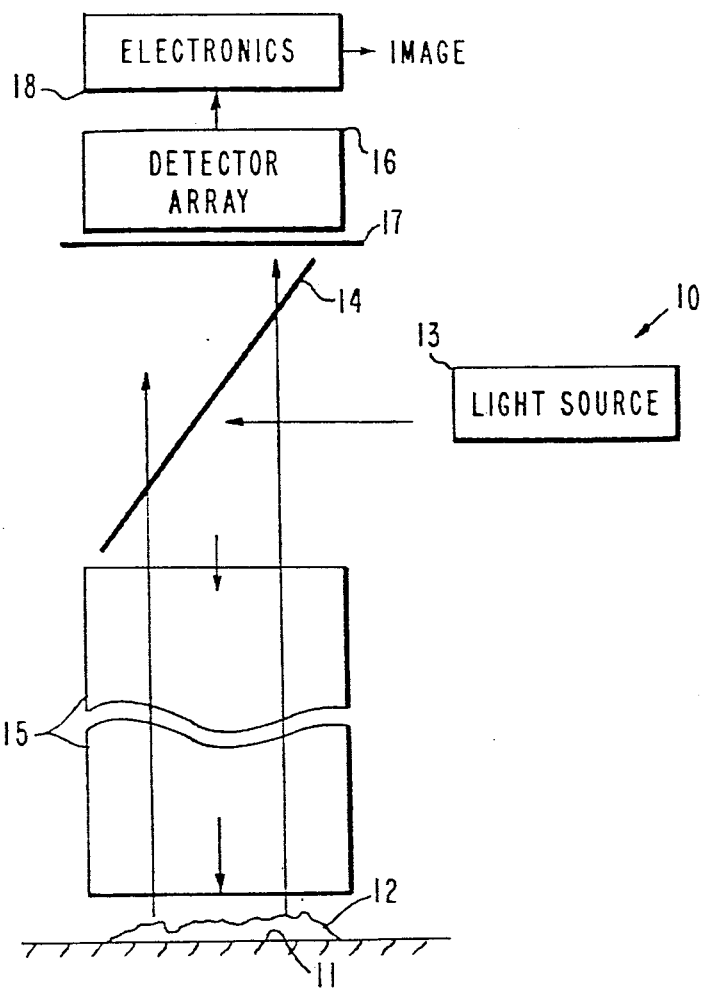
FIG. 1 shows a first embodiment of a fingerprint identification system in accordance with the principles of the present invention.

FIG. 1 shows a first embodiment of a fingerprint identification system 10 in accordance with the principles of the present invention. The system comprises a light source 13, such as a 1.55 μm erbium laser, for example, that is adapted to illuminate a fingerprint 11 by means of a beamsplitter 14 having an optional narrow band filter deposited on it. A fiber optic bundle 15 is adapted to couple the light between the beam-splitter 14 and the fingerprint 11. A detector array 16 is disposed adjacent the beam-splitter 14 and is adapted to receive light emitted from the fingerprint and transmitted by way of the fiber optic bundle 15 and the beamsplitter 14. Detector electronics 18 is coupled to the detector array 16 that is adapted to convert signals generated by the detector array 16 into an image in a conventional manner.

For signal to noise enhancement and background reduction, the beamsplitter 14 may include a narrow band filter deposited on it such that there is 99% transmission at the strongest upconverted band, preferably at a nominal 0.98 μm wavelength. In addition, the filter should have about a 90% reflectance at the 1.55 μm±100 μm wavelength of the erbium laser light source 13. Since an erbium laser light source 13 may have peak powers of approximately 100 watts in pulse lasting for 1 msec, and the detector array 16 typically saturates at very low optical input power, a neutral density filter or aperture diaphragm 17 may be employed. The location of the neutral density filter or aperture diaphragm 17 is between the beamsplitter 14 and the detector array 16.

In operation, the fingerprint 11 is dusted with the upconversion material 12, such as triply ionized rare earth erbium, for example, such that residual oils from the finger retain some of the upconversion material 12. The 1.55 μm light source 13, preferably an erbium laser, illuminates the fingerprint 11 by means of the beamsplitter 14 and fiber optic bundle 15. The powder upconverts the 1.55 μm radiation to several wavelength bands extending between 380 μm and 2.7 μm. This upconverted radiation travels back up the fiber optic bundle 15 through the beamsplitter 14 to the detector array 16. The detector array 16 is scanned electronically and produces an image in a conventional manner.

The resolution required for system operation is based on the smallest sized feature on a fingerprint that is needed during visual or automated comparisons. To get an order of magnitude estimate, assume the smallest feature on a fingerprint 11 is 250 μm or 1/100 of an inch. The upconversion material 12 used to generate the fingerprint 11 shown in FIG. 2 has a 25 μm particle size. The fiber optic bundle 15 has a 2.50 μm fiber core diameter. Detector arrays 16 are commercially available that have a 50 μm spacing between detectors in a 100×100 array. Thus, off-the-shelf instrumentation may be used to obtain sufficient resolution.

Figure 2:
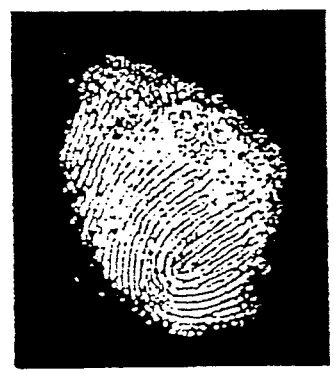
FIG. 2 shows a typical fingerprint and is illustrative in explaining the operation of the present invention.

FIG. 2 shows a typical fingerprint 11 and is illustrative in explaining the operation of the present invention. The fingerprint 11 was deposited on a glass microscope slide. An upconversion material 12 was brushed over the fingerprint 11 and the excess was removed with a stream of air. The slide was illuminated with an erbium glass laser light source 13 operating at a 1.54 μm wavelength and having a power of approximately 10 watts/cm$^2$. The fingerprint 11 shown in FIG. 2 was reproduced from a picture taken with a Polaroid camera. The smeared portion is from the imperfect fingerprint application by the test subject and not from the recording system. FIG. 2 shows relatively good contrast between ridges of the fingerprint 11.

Figure 3:
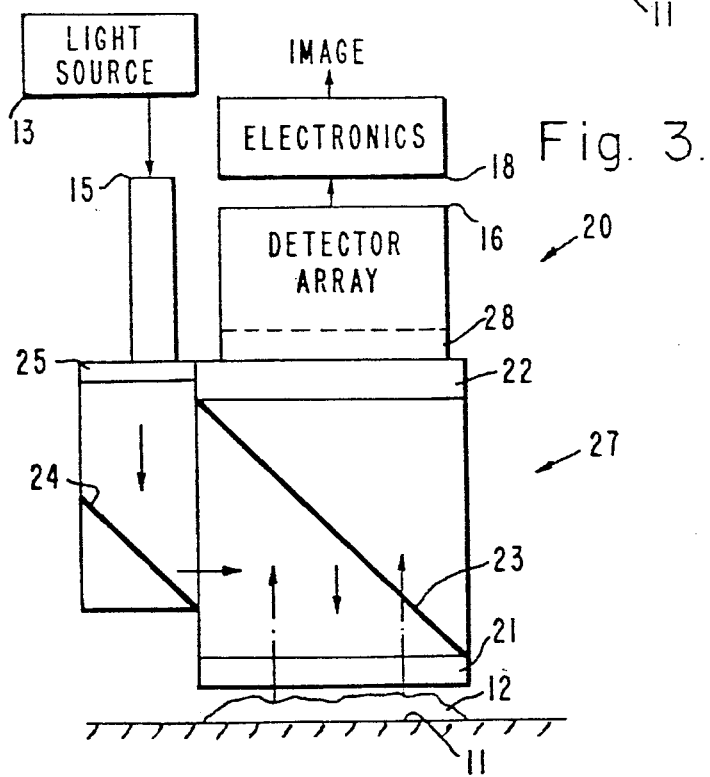
FIG. 3 shows a second embodiment of a fingerprint identification system in accordance with the principles of the present invention.

As an alternative to the system 10 of FIG. 1, FIG. 3 shows a second embodiment of a fingerprint identification system 20 in accordance with the principles of the present invention. The second system 20 comprises transfer optics 27 including an objective lens 21 and a focusing lens 22 having a right angle prism 23 disposed therebetween. A detector array 16, such as a charge coupled device (CCD) detector array, for example, is disposed adjacent the focusing lens 22. Detector electronics 18 is coupled to the detector array 16 that is adapted to convert signals generated by the detector array 16 into an image in a conventional manner. Infrared radiation provided by a light source 13, such as an erbium laser, for example, is coupled by way of an optical fiber bundle 15, a wide angle lens 25, and a corner cube prism 24 disposed adjacent to the right angle prism 23 such that it is reflected from the right angle prism 23 onto the fingerprint 11 of interest. The CCD detector array 16 and transfer optics 27 may be mounted on a wand, for example. An optional transmission filter 28 may also be located between the detector array 16 and the transfer optics 27, or a filter material may be deposited directly on the focusing lens 22.

In operation the system 20 of FIG. 3 operates as follows. Light from the erbium glass laser light source 13 travels along the optical fiber bundle 15 to the sensor head. The wide angle lens 25 expands the beam, and the corner cube prism 24 directs the 1.55 μm radiation to the right angle prism 23 that has a 99% reflective coating at 1.55 μm±100 nm and a narrow band transmission of 99% at the upconverted wavelength.

The right angle prism 23 then directs the 1.55 μm infrared radiation through the objective lens 21 onto the fingerprint 11 dusted with upconversion material 12. The upconverted radiation passes back through the objective lens 21, past the right angle prism 23, through the focusing lens 22 and/or transmission filter 28 and is focused on the detector array 16 after which it is imaged locally or at a remote location in a conventional manner by the detector electronics 18.

Thus there has been described a new and improved fingerprint identification system utilizing the upconversion and detection of infrared radiation. It is to be understood that the above-described embodiments are merely illustrative of some of the many specific embodiments which represents applications of the principles of the present invention. Clearly, numerous and other arrangements can be readily devised by those skilled in the art without departing from the scope of the invention.

What is claimed is:

1. A system for detecting a fingerprint using an upconversion material adapted for deposition on the fingerprint, the material being capable of upconverting radiation at a first predetermined wavelength into radiation at a second wavelength when irradiated with radiation at the first predetermined wavelength, the system comprising:

a light source comprising means for providing radiation at the first predetermined wavelength to cause upconversion in said material;

detection means comprising a detector array for receiving radiation at the second wavelength to provide an image; and a plurality of bidirectional light coupling means for disposition between the light source and the fingerprint for coupling radiation at the first predetermined wavelength to the fingerprint in said bidirectional means, and for disposition between the detection means and the fingerprint for coupling radiation at the second wavelength from the fingerprint to the detection means in said bidirectional means;

whereby radiation provided by the light source that irradiates the fingerprint is converted to radiation detectable by the detection means as a result of upconversion, to provide an image of the fingerprint.

2. The system of claim 1 wherein the material comprises a powdered host material containing triply ionized rare earth erbium.

3. The system of claim 1 wherein the light source comprises 1.55 μm erbium laser light source.

4. The system of claim 1 wherein the detection means comprises a charge coupled device detector array.

5. The system of claim 1 wherein the detector array comprises a diode matrix detector array.

6. The system of claim 1 wherein the light coupling means comprises:
   an optical fiber bundle disposed between the light source and the fingerprint;
   a beamsplitter disposed between the optical fiber bundle and the detection means.

7. The system of claim 1 wherein the light coupling means comprises:
   a first optical arrangement comprising a bidirectional fiber optic bundle, a corner cube prism positioned to reflect radiation at the first predetermined wavelength, and a lens disposed between the fiber optic bundle and the corner cube prism, and
   a second optical arrangement comprising a focusing lens, an objective lens, and a right angle prism disposed between the focusing lens and the objective lens, and wherein the right angle prism is positioned to couple radiation at the first predetermined wavelength from the first optical arrangement to the fingerprint, and wherein the second optical arrangement is positioned to couple radiation at the second predetermined wavelength from the fingerprint to the detection means.

8. A method of detecting a fingerprint comprising the steps of:
   depositing a material on a fingerprint, said material being capable of upconverting radiation at a first predetermined wavelength into radiation at a second wavelength when irradiated with radiation at the first predetermined wavelength;
   illuminating the fingerprint with radiation at the first predetermined wavelength;
   detecting radiation at the second wavelength emitted by the fingerprint; and
   converting the detected radiation into an image of the fingerprint.

9. The method of claim 8 wherein the step of depositing a material comprises the step of depositing a powdered host material containing triply ionized rare earth erbium.

10. The method of claim 8 wherein the step of illuminating the fingerprint comprises illuminating the fingerprint with an infrared light source.

11. The method of claim 10 wherein the step of illuminating the fingerprint with an infrared light source comprises illuminating the fingerprint with a 1.55 μm erbium laser light source.

12. The method of claim 8 wherein the step of detecting radiation at the second wavelength comprises detecting radiation at the second wavelength with a charge coupled device detector array.

13. A method of detecting a fingerprint comprising the steps of:
   depositing a material on a fingerprint, said material being capable of upconverting infrared radiation at a first predetermined wavelength into radiation at a second wavelength when irradiated with radiation at the first predetermined wavelength;
   illuminating the fingerprint with infrared radiation at the first predetermined wavelength;
   detecting radiation at the second wavelength emitted by the fingerprint; and
   converting the detected radiation into an image of the fingerprint.

14. A kit for detecting a fingerprint comprising:
   an upconversion material adapted for deposition on the fingerprint, the material for upconverting radiation at a first predetermined wavelength into radiation at a second wavelength when irradiated with radiation at the first predetermined wavelength;
   a light source comprising means for providing radiation at the first predetermined wavelength to cause upconversion in said material;
   a detector array for receiving radiation at the second wavelength to provide an image; and
   a plurality of bidirectional light coupling means for disposition between the light source and the fingerprint for coupling radiation at the first predetermined wavelength to the fingerprint in said bidirectional means, and for disposition between the detection means and the fingerprint for coupling radiation at the second wavelength from the fingerprint to the detection means in said bidirectional means;
   whereby radiation provided by the light source that irradiates the fingerprint is converted to radiation detectable by the detector array as a result of upconversion to provide an image of the fingerprint.

15. A kit for detecting a fingerprint on a surface comprising:
   an upconversion material adapted for deposition on the fingerprint and a light source, said light source for providing infrared radiation at a first predetermined wavelength to cause the material to upconvert the infrared radiation to a second predetermined wavelength but causing substantially no such upconversion by the surface at said first wavelength;
   a detector array for receiving radiation at the second wavelength to provide an image; and
   a plurality of bidirectional light coupling means for disposition between the light source and the fingerprint for coupling radiation at the first predetermined wavelength to the fingerprint in said bidirectional means, and for disposition between the detector array and the fingerprint for coupling radiation at the second wavelength from the fingerprint to the detector array in said bidirectional means;
   whereby radiation provided by the light source that irradiates the fingerprint is converted to radiation detectable by the detector array as a result of upconversion to provide an image of the fingerprint.

* * * * *